(12) United States Patent
Yang et al.

(10) Patent No.: US 11,936,175 B2
(45) Date of Patent: Mar. 19, 2024

(54) REVERSE POWER CONNECTION PREVENTING CIRCUIT, POWER DISTRIBUTION APPARATUS, AND POWER SUPPLY AND DISTRIBUTION SYSTEM

(71) Applicant: Huawei Digital Power Technologies Co., Ltd., Shenzhen (CN)

(72) Inventors: Zezhou Yang, Dongguan (CN); Xiaoke Ran, Dongguan (CN); Wanxiang Ye, Dongguan (CN); Liqiong Yi, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/865,656

(22) Filed: Jul. 15, 2022

(65) Prior Publication Data

US 2022/0352713 A1    Nov. 3, 2022

Related U.S. Application Data

(63) Continuation of application No. PCT/CN2021/097935, filed on Jun. 2, 2021.

(30) Foreign Application Priority Data

Nov. 13, 2020    (CN) .......................... 202011269747.9

(51) Int. Cl.
*H02H 11/00*    (2006.01)
(52) U.S. Cl.
CPC ................................ *H02H 11/002* (2013.01)

(58) Field of Classification Search
CPC ...................................................... H02H 11/002
See application file for complete search history.

(56) References Cited

U.S. PATENT DOCUMENTS

| | | | | | |
|---|---|---|---|---|---|
| 6,078,160 | A | * | 6/2000 | Cilluffo | H02H 7/0851 |
| | | | | | 318/641 |
| 7,616,421 | B2 | * | 11/2009 | Hickam | H02H 3/14 |
| | | | | | 361/84 |

(Continued)

FOREIGN PATENT DOCUMENTS

| | | |
|---|---|---|
| CN | 1354487 A | 6/2002 |
| CN | 2911950 Y | 6/2007 |

(Continued)

*Primary Examiner* — Sisay G Tiku
(74) *Attorney, Agent, or Firm* — Maier & Maier, PLLC

(57) ABSTRACT

A reverse power connection preventing circuit includes a diode and an actuation unit that are connected in series between a positive input terminal and a negative input terminal of a circuit breaker. A positive electrode of the diode points to the negative input terminal of the circuit breaker, and a negative electrode of the diode points to the positive input terminal of the circuit breaker. When a power supply is forward connected to the circuit breaker, the diode is cut off, there is no current on the actuation unit, and the reverse power connection preventing circuit is in a power-off state. When the power supply is reversely connected to the circuit breaker, the diode conducts, and the actuation unit is configured to prevent closing of the circuit breaker, and/or the actuation unit is configured to perform an alarm prompt, to perform an early warning.

15 Claims, 13 Drawing Sheets

(56) References Cited

U.S. PATENT DOCUMENTS

| | | | |
|---|---|---|---|
| 9,142,951 B2* | 9/2015 | Pavlin | H01L 27/0251 |
| 2002/0024784 A1* | 2/2002 | Pinto de Oliveira | ............... |
| | | | H02H 11/002 |
| | | | 361/84 |
| 2003/0094858 A1* | 5/2003 | Shiue | H01H 47/18 |
| | | | 307/141 |
| 2007/0230229 A1* | 10/2007 | Bryan | H02H 9/001 |
| | | | 365/32 |
| 2017/0271862 A1* | 9/2017 | Crispim | H02H 3/18 |
| 2018/0182587 A1* | 6/2018 | Koepf | H01H 71/28 |
| 2021/0313779 A1* | 10/2021 | Zhao | H02B 1/04 |
| 2022/0189721 A1* | 6/2022 | Telefus | H02M 1/083 |
| 2023/0104392 A1* | 4/2023 | Zhang | H01R 13/713 |
| | | | 136/251 |

FOREIGN PATENT DOCUMENTS

| | | | |
|---|---|---|---|
| CN | 101630611 A | | 1/2010 |
| CN | 102339696 A | | 2/2012 |
| CN | 102496923 A | | 6/2012 |
| CN | 103489723 A | | 1/2014 |
| CN | 204480986 U | | 7/2015 |
| CN | 107578936 A | | 1/2018 |
| CN | 108305820 A | | 7/2018 |
| CN | 109546642 A | | 3/2019 |
| CN | 208608710 U | | 3/2019 |
| CN | 112510670 A | | 3/2021 |
| EP | 2498369 A2 | | 9/2012 |
| GB | 2295284 A | | 5/1996 |
| IN | 103545804 A | | 1/2014 |
| JP | H08315666 A | * | 11/1996 |

* cited by examiner

REVERSE POWER CONNECTION PREVENTING CIRCUIT, POWER DISTRIBUTION APPARATUS, AND POWER SUPPLY AND DISTRIBUTION SYSTEM

CROSS-REFERENCE TO RELATED APPLICATIONS

This application is a continuation of International Application No. PCT/CN2021/097935, filed on Jun. 2, 2021, which claims priority to Chinese Patent Application No. 202011269747.9, filed on Nov. 13, 2020. The disclosures of the aforementioned applications are hereby incorporated by reference in their entireties.

TECHNICAL FIELD

The embodiments relate to the field of circuit technologies, a reverse power connection preventing circuit, a power distribution apparatus, and a power supply and distribution system.

BACKGROUND

A storage battery is an important component of a power supply and distribution system. As a direct current backup power supply in the power supply and distribution system, the storage battery provides a safe, stable, and reliable power guarantee for a communications device when alternating current power supply is interrupted or fails for short time, thereby ensuring normal operation of the communications device. In the power supply and distribution system, as shown in FIG. 1, a storage battery 1 is usually connected to a system bus by using a circuit breaker 2. Due to manual wiring, an operational error, shown in FIG. 2, that cables of the storage battery 1 are reversely connected is unavoidable, and device damage and a safety accident that are caused by the reverse connection of the storage battery 1 sometimes occur.

Currently, to prevent a short-circuit caused by a reverse connection of a storage battery, as shown in FIG. 3, a magnetic contactor 3 is connected in series behind the circuit breaker 2, and voltage sampling circuits 41 and 42 are respectively disposed at two ends of the magnetic contactor 3. Only when determining that voltages detected by the two voltage sampling circuits 41 and 42 have same polarity, a control unit 5 sends an instruction for closing the magnetic contactor 3.

In the foregoing solution, when the storage battery 1 is reversely connected and the circuit breaker 2 is switched on, the voltage sampling circuit 41 at one end that is of the magnetic contactor 3 and that is close to the circuit breaker 2 samples a voltage of the reversely connected storage battery 1, and the voltage sampling circuit 42 at the other end of the magnetic contactor 3 samples a voltage on the system bus. Therefore, the voltages of the two ends are inconsistent, and the magnetic contactor 3 is not closed, thereby preventing a short-circuit failure. However, adding the magnetic contactor and the voltage sampling circuits causes higher costs, a larger volume, a higher loss, and a higher heat dissipating requirement.

SUMMARY

The embodiments provide a reverse power connection preventing circuit, a power distribution apparatus, and a power supply and distribution system, to avoid a loss caused by a reverse connection between a power supply and a circuit breaker.

According to a first aspect, the embodiments provide a reverse power connection preventing circuit, including a diode and an actuation unit that are connected in series. The diode and the actuation unit that are connected in series are configured to connect a positive input terminal and a negative input terminal of the circuit breaker. A positive electrode of the diode points to the negative input terminal of the circuit breaker, and a negative electrode of the diode points to the positive input terminal of the circuit breaker. When a power supply is forward connected to the circuit breaker, the diode is cut off, there is no current on the actuation unit, and the reverse power connection preventing circuit is in a power-off state. When the power supply is reversely connected to the circuit breaker, the diode conducts, and the actuation unit is configured to prevent closing of the circuit breaker, or the actuation unit is configured to perform an alarm prompt, to perform an early warning to prompt an operator not to close the circuit breaker. Additionally, the actuation unit may be alternatively configured to: when the diode conducts, prevent closing of the circuit breaker and also perform an alarm prompt. Therefore, a short-circuit accident caused by the reverse connection of the power supply is completely prevented. Furthermore, the reverse power connection preventing circuit also ensures safety of on-site construction, thereby fundamentally avoiding a safety risk caused by the reverse connection. In addition, the reverse power connection preventing circuit provided in the embodiments is simple in structure, so that a volume and costs can be reduced compared with the conventional technology.

The reverse power connection preventing circuit provided in the embodiments may further include a current limiting resistor. After being connected in series to the diode and the actuation unit, the current limiting resistor is configured to connect the positive input terminal and the negative input terminal of the circuit breaker. The current limiting resistor can limit a current flowing through the diode and the actuation unit, thereby reducing power consumption and protecting components.

The reverse power connection preventing circuit provided in the embodiments may further include a fuse. After being connected in series to the current limiting resistor, the diode, and the actuation unit, the fuse is configured to connect the positive input terminal and the negative input terminal of the circuit breaker. The fuse is blown due to overcurrent during a lightning surge, to prevent a case in which because lightning breaks down the diode, the circuit breaker cannot be normally closed when the power supply is forward connected.

In a possible implementation, the circuit breaker includes a switch on mechanism. The switch on mechanism is configured to: when being manipulated, control the circuit breaker to be closed or open. The actuation unit is configured to lock the switch on mechanism when the diode conducts.

Further, when the actuation unit is configured to lock the switch on mechanism when the diode conducts, the actuation unit may include an electromagnet, and a clamping slot is disposed on the switch on mechanism of the circuit breaker. The electromagnet is connected in series to the diode and the current limiting resistor. The electromagnet is configured to: when the diode conducts, drive an armature of the electromagnet to be inserted into the clamping slot, to lock the switch on mechanism of the circuit breaker to prevent closing of the circuit breaker.

In another possible implementation, the circuit breaker includes a switch off mechanism. The switch off mechanism is configured to: when being driven, control the circuit breaker to be in an open state. The actuation unit is configured to drive the switch off mechanism when the diode conducts.

Further, when the actuation unit is configured to drive the switch off mechanism when the diode conducts, the actuation unit may include a first electromagnetic tripper. The first electromagnetic tripper is connected in series to the diode and the current limiting resistor. The first electromagnetic tripper is configured to drive the switch off mechanism of the circuit breaker when the diode conducts, to control the circuit breaker to be in the open state.

Optionally, the circuit breaker further includes a second electromagnetic tripper. An iron core of the second electromagnetic tripper is reused as an iron core of the first electromagnetic tripper. An armature of the second electromagnetic tripper is reused as an armature of the first electromagnetic tripper. The original components of the second electromagnetic tripper are reused. It is equivalent that the actuation unit includes only a third coil sleeved onto a second iron core of the second electromagnetic tripper. Therefore, a structure of the reverse power connection preventing circuit is simplified, so that both a volume of the reverse power connection preventing circuit and costs can be reduced.

Further, when the actuation unit is configured to drive the switch off mechanism when the diode conducts, the actuation unit includes a first thermal tripper. The first thermal tripper is connected in series to the diode and the current limiting resistor. The first thermal tripper is configured to drive the switch off mechanism of the circuit breaker when the diode conducts, to control the circuit breaker to be in the open state.

Optionally, the circuit breaker further includes a second thermal tripper. The second thermal tripper includes a thermal deformation metal. The second thermal tripper is reused as the first thermal tripper, that is, the second thermal tripper needs to be connected in series to the diode and the current limiting resistor, to avoid adding an additional thermal tripper. Therefore, a structure of the reverse power connection preventing circuit is simplified, so that both a volume of the reverse power connection preventing circuit and costs can be reduced.

Alternatively, when the circuit breaker further includes the second thermal tripper, the actuation unit includes a heat emitting element. The heat emitting element is connected in series to the diode and the current limiting resistor. The heat emitting element is configured to deform the thermal deformation metal when the diode conducts, to drive the switch off mechanism of the circuit breaker to control the circuit breaker to be in the open state.

In another implementable embodiment, the actuation unit may further include a buzzer and/or a prompt light. When the power supply is reversely connected, the diode conducts, and the buzzer sends a sound alarm, the prompt light sends a light alarm, or the buzzer sends a sound alarm and simultaneously the prompt light sends a light alarm, to perform an early warning to prompt an operator not to close the circuit breaker. When the power supply is forward connected, the diode is cut off, and the actuation unit is not powered on.

When the reverse power connection preventing circuit includes the fuse, and the actuation unit includes the electromagnet, the fuse may be reused as at least a part of a coil of the electromagnet.

According to a second aspect, the embodiments further provide a power distribution apparatus, including a circuit breaker and the foregoing reverse power connection preventing circuit. The reverse power connection preventing circuit is connected between a positive input terminal and a negative input terminal of the circuit breaker.

According to a third aspect, the embodiments further provide a power supply and distribution system, including a power supply and the foregoing power distribution apparatus. A positive electrode of the power supply is connected to a positive input terminal of a circuit breaker in the power distribution apparatus, and a negative electrode of the power supply is connected to a negative input terminal of the circuit breaker in the power distribution apparatus.

DETAILED DESCRIPTION OF THE EMBODIMENTS

Figure 1:
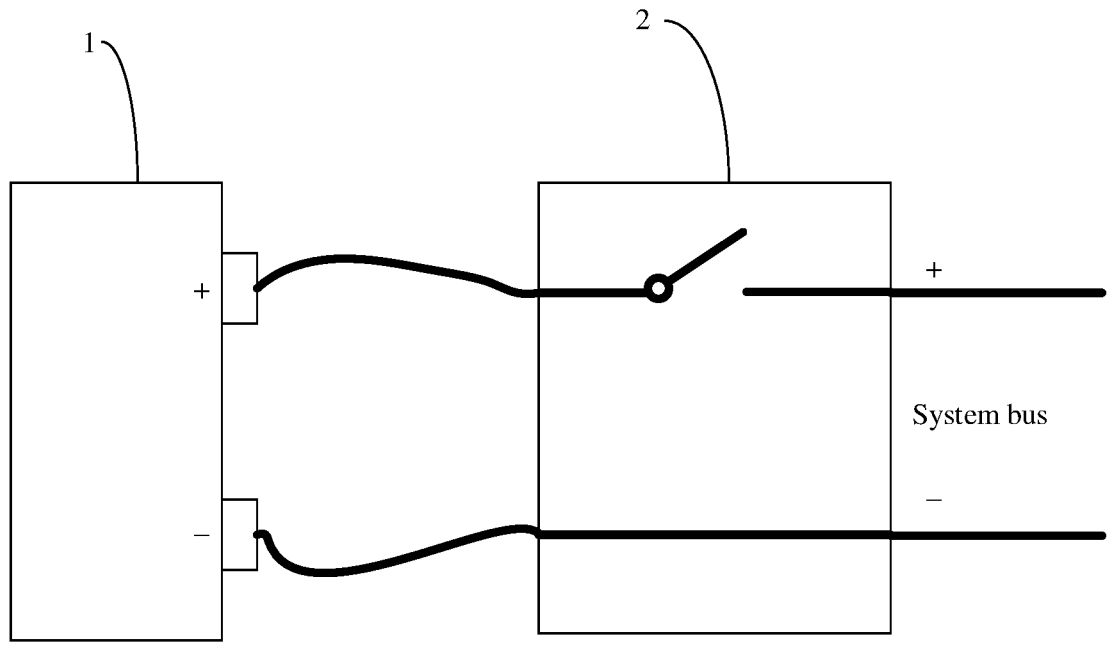
FIG. 1 is a schematic diagram of a forward connection between a storage battery and a circuit breaker in a power supply and distribution system.
Figure 2:
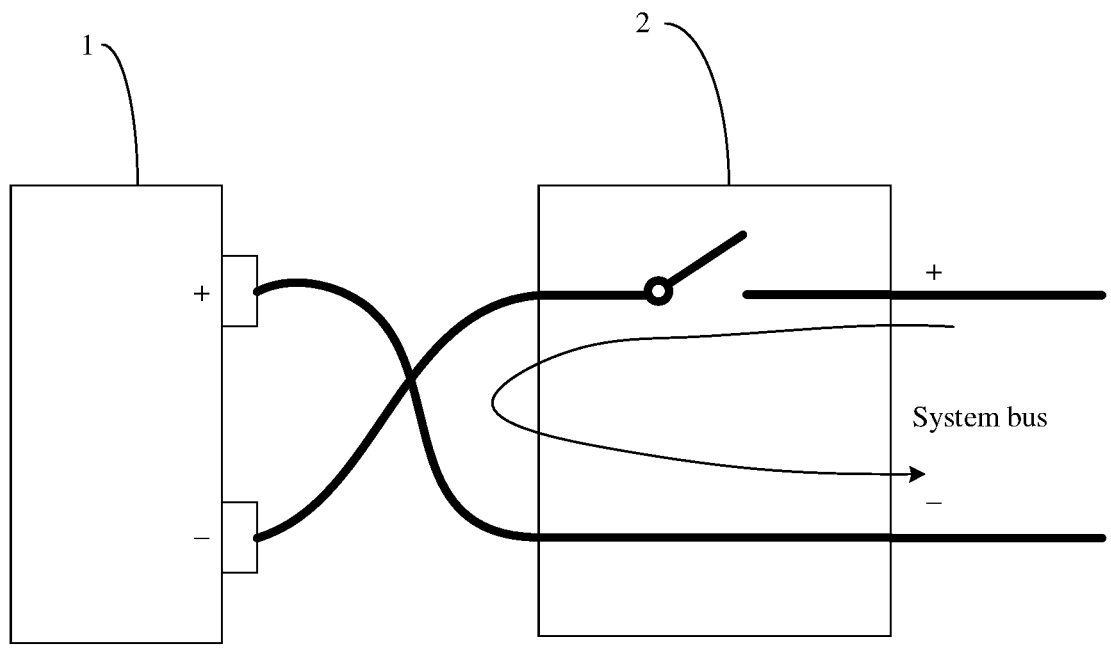
FIG. 2 is a schematic diagram of a reverse connection between a storage battery and a circuit breaker in a power supply and distribution system.
Figure 3:
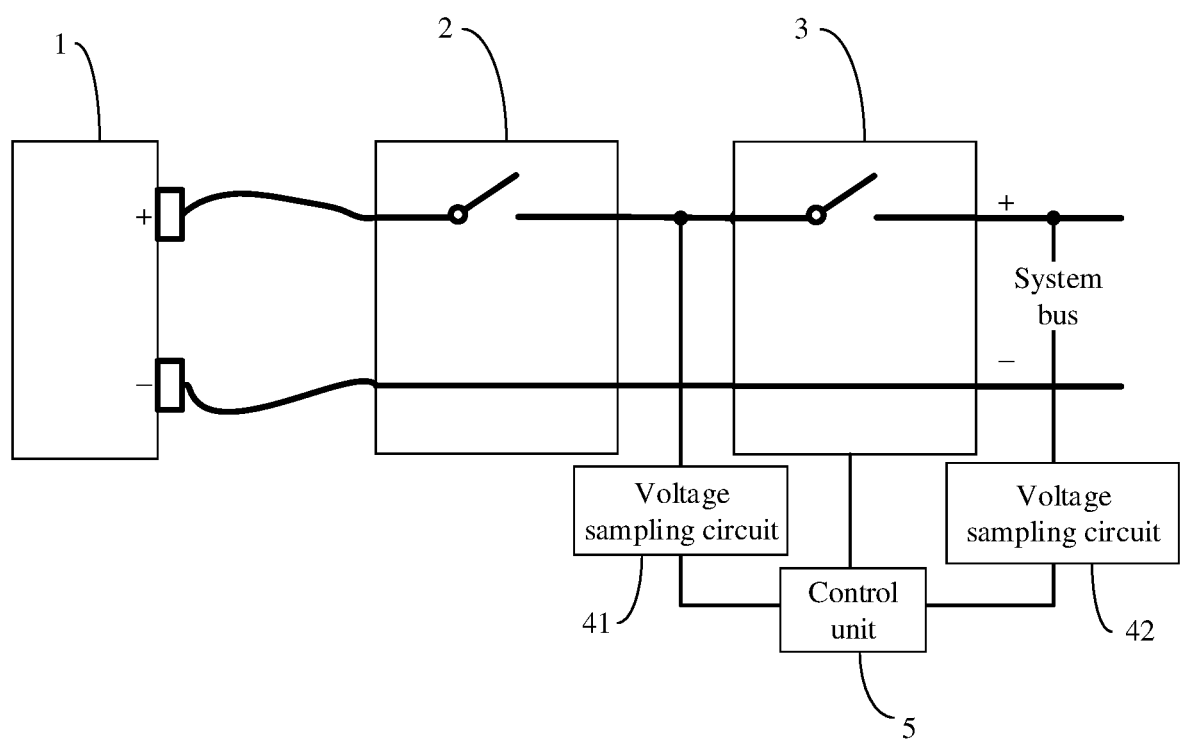
FIG. 3 is a schematic diagram of a structure in a power supply and distribution system in a related technology.

To make objectives, solutions, and advantages of the embodiments clearer, the following further describes the embodiments in detail with reference to the accompanying drawings. However, the example implementations may be implemented in a plurality of forms, and it should not be understood as being limited to the example implementations described herein. Conversely, the implementations are provided to make the embodiments more comprehensive and complete, and comprehensively convey the idea of the example implementations to a person skilled in the art. Same reference signs in the drawings represent same or similar structures, and therefore repeated descriptions thereof are omitted. Words that express positions and directions and that are described in the embodiments are all descriptions provided by using the accompanying drawings as an example, but changes may be made as required, and the made changes shall be all included in the scope of the embodiments. The accompanying drawings are used to illustrate only a relative position relationship, and do not represent a true proportion.

It should be noted that details are set forth in the following description for ease of fully understanding the embodiments. However, the embodiments can be implemented in a plurality of manners different from those described herein, and a person skilled in the art can perform similar promotion without departing from the embodiments. Therefore, the embodiments are not limited to the following implementations. The following descriptions are examples of implementing the embodiments. However, the descriptions are intended to describe the general principle, and are not intended to limit the scope of the embodiments.

Figure 4:
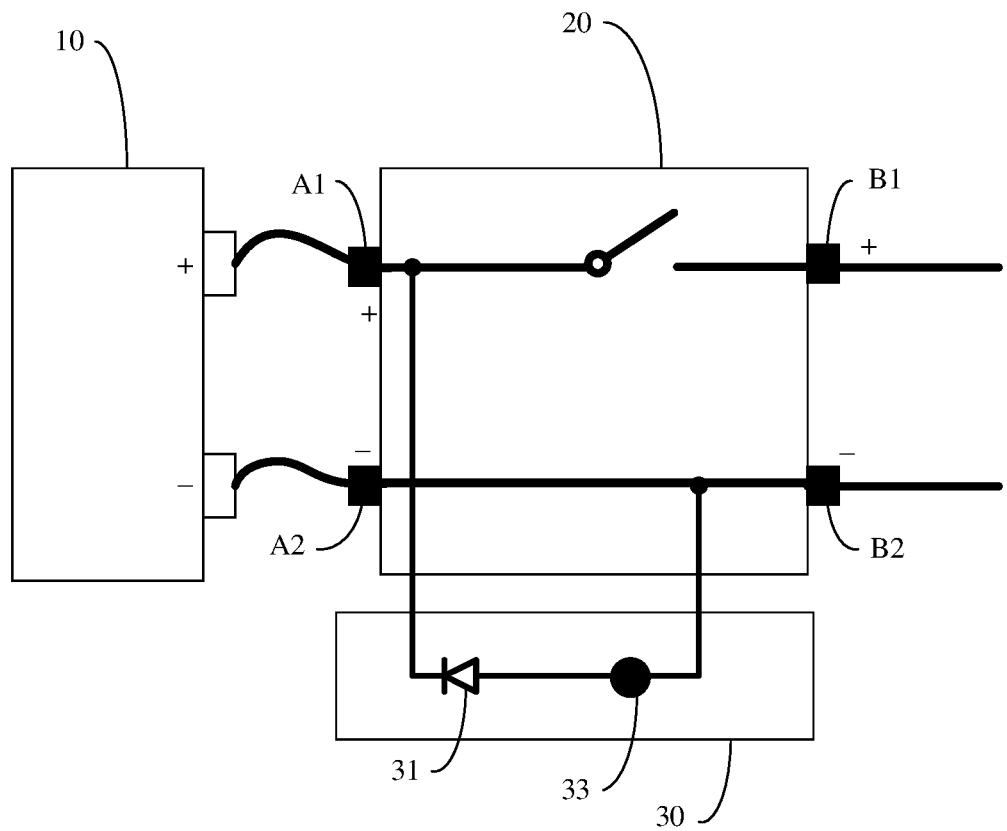
FIG. 4 is a schematic diagram of an application scenario of a reverse power connection preventing circuit according to an embodiment.

To facilitate understanding of a reverse power connection preventing circuit provided in an embodiment, the following first describes an application scenario of the reverse power connection preventing circuit. The reverse power connection preventing circuit provided in this embodiment may be widely applied to various power supply and distribution systems. For example, FIG. 4 shows a possible application scenario according to an embodiment. As shown in FIG. 4, a power supply and distribution system includes a power supply 10, a circuit breaker 20, and a reverse power connection preventing circuit 30. The circuit breaker 20 is configured to conduct, carry, or cut off a current between a power supply network and electric equipment. When a circuit between the power supply network or the power supply 10 and the electric equipment needs to be connected, the circuit breaker 20 may be switched to a closed state. When the circuit between the power supply network and the electric equipment needs to be disconnected, the circuit breaker 20 may be switched to an open state. As a backup power supply in the power supply and distribution system, the power supply 10 provides a safe, stable, and reliable power guarantee for a communications device when an alternating current power supply is interrupted or fails for a short time, thereby ensuring normal operation of the communications device. The power supply 10 may be a storage battery, an electric generator, or the like. Because the power supply 10 is usually manually connected to the circuit breaker 20, an operational error that cables of the power supply 10 are reversely connected is unavoidable. If the reverse power connection preventing circuit 30 is not disposed, the reverse connection of the power supply 10 may cause device damage and a safety accident.

However, because the reverse power connection preventing circuit 30 is disposed in the power supply and distribution system, the reverse power connection preventing circuit 30 can determine, when the power supply 10 is connected to the circuit breaker 20 and before the circuit breaker 20 is closed, whether the power supply 10 is reversely connected, and perform an early warning or prevent closing of the circuit breaker 20, to avoid a short-circuit current generated by the reverse connection. To facilitate understanding of the circuit breaker 20, the following describes, with reference to the embodiments and accompanying drawings, the circuit breaker 20.

Figure 5:
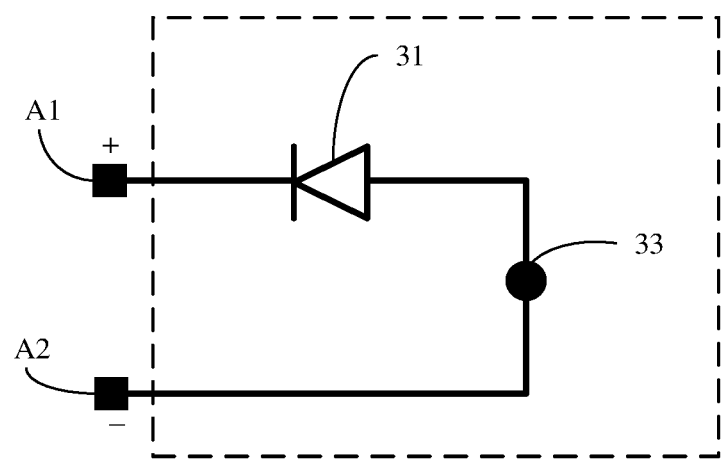
FIG. 5 is a schematic diagram of a structure of a reverse power connection preventing circuit according to another embodiment.

FIG. 5 is a schematic diagram of a structure of the reverse power connection preventing circuit according to an embodiment. Referring to FIG. 5, the reverse power connection preventing circuit 30 provided in this embodiment includes a diode 31 and an actuation unit 33 that are connected in series. The diode 31 and the actuation unit 33 that are connected in series are configured to connect a positive input terminal A1 and a negative input terminal A2 of the circuit breaker 20. A positive electrode of the diode 31 points to the negative input terminal A2 of the circuit breaker 20, and a negative electrode of the diode 31 points to the positive input terminal A1 of the circuit breaker 20. When the power supply 10 is forward connected to the circuit breaker 20, the diode 31 is cut off, there is no current on the actuation unit 33, and the reverse power connection preventing circuit 30 is in a power-off state. When the power supply 10 is reversely connected to the circuit breaker, the diode 31 conducts, and the actuation unit 33 is configured to prevent closing of the circuit breaker 20, or the actuation unit 33 is configured to perform an alarm prompt, to perform an early warning to prompt an operator not to close the circuit breaker 20. Additionally, the actuation unit 33 may be alternatively configured to: when the diode 31 conducts, prevent closing of the circuit breaker 20 and also perform an alarm prompt. Therefore, a short-circuit accident caused by the reverse connection of the power supply 10 is completely prevented. Furthermore, the reverse power connection preventing circuit 30 also ensures safety of on-site construction, thereby fundamentally avoiding a safety risk caused by the reverse connection. In addition, the reverse power connection preventing circuit 30 is simple in structure, so that a volume and costs can be reduced compared with the conventional technology.

Figure 6:
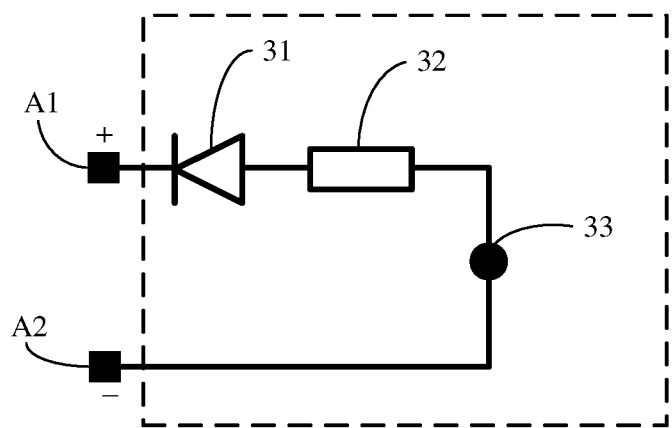
FIG. 6 is a schematic diagram of a structure of a reverse power connection preventing circuit according to another embodiment.

For example, as shown in FIG. 6, the reverse power connection preventing circuit 30 may further include a current limiting resistor 32. After being connected in series to the diode 31 and the actuation unit 33, the current limiting resistor 32 is configured to connect the positive input terminal A1 and the negative input terminal A2 of the circuit breaker (not shown in FIG. 6). The current limiting resistor 32 can limit a current flowing through the diode 31 and the actuation unit 33, thereby reducing power consumption and protecting components.

Figure 7:
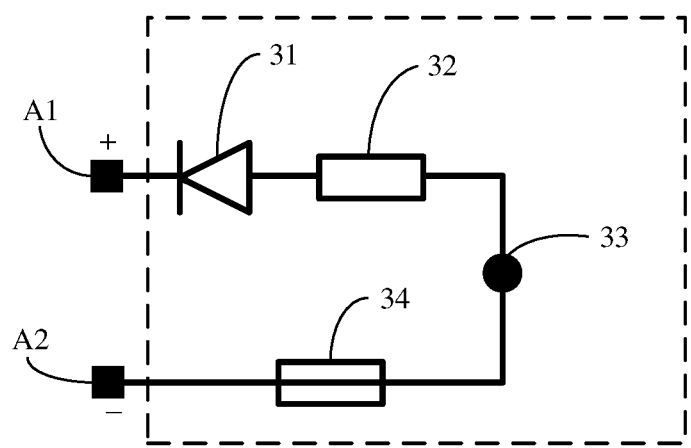
FIG. 7 is a schematic diagram of a structure of a reverse power connection preventing circuit according to another embodiment.

For example, as shown in FIG. 7, the reverse power connection preventing circuit 30 may further include a fuse 34. After being connected in series to the current limiting resistor 32, the diode 31, and the actuation unit 33, the fuse 34 is configured to connect the positive input terminal A1 and the negative input terminal A2 of the circuit breaker (not shown in FIG. 7). The fuse is blown due to overcurrent during a lightning surge, to prevent a case in which because lightning breaks down the diode 31, the circuit breaker 20 cannot be normally closed when the power supply 10 is forward connected.

It should be noted that positions of the diode 31, current limiting resistor 32, actuation unit 33, and fuse 34 are not limited, provided that the four components are connected in series.

The following describes details with reference to the embodiments. It should be noted that the embodiments are intended to better explain but are not intended as limiting.

Figure 8:
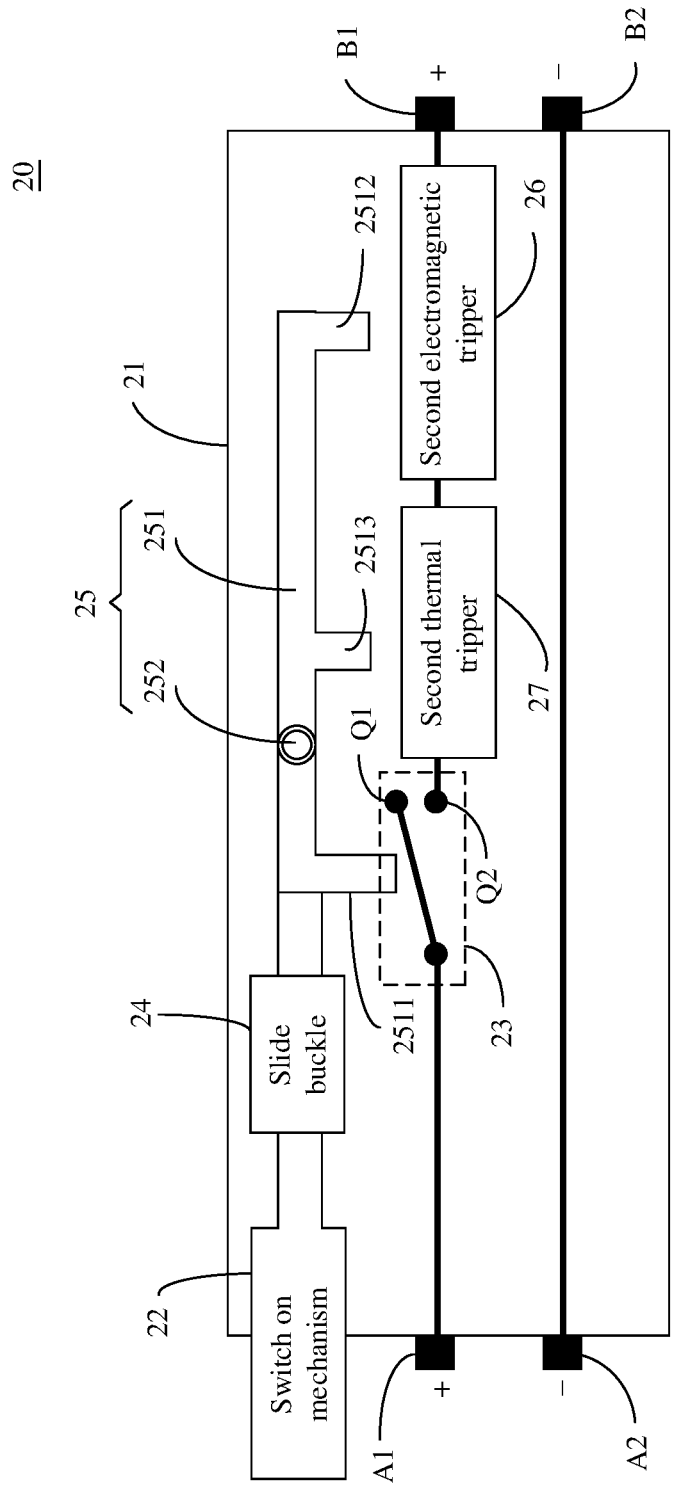
FIG. 8 is a schematic diagram of a structure of a circuit breaker according to an embodiment.

During implementation, referring to FIG. 8, the circuit breaker 20 may include a housing 21 and a switch on mechanism 22 disposed on the housing 21. Switching of the circuit breaker 20 between the closed state and the open state may be implemented by controlling the switch on mechanism 22. The circuit breaker 20 further includes input terminals and output terminals that are disposed in the housing 21. The input terminals are configured to be connected to a power supply line, and the output terminals are configured to be connected to a power receiving line. There are two input terminals: a positive input terminal A1 and a negative input terminal A2. The positive input terminal A1 is configured to be connected to a positive electrode of the power supply line, and the negative input terminal A2 is configured to be connected to a negative electrode of the power supply line. There are two output terminals: a positive output terminal B1 and a negative output terminal B2. The positive output terminal B1 is configured to be connected to a positive electrode of the power receiving line, and the negative output terminal B2 is configured to be connected to a negative electrode of the power receiving line.

To enable the power supply line to be electrically connected to the power receiving line by using the circuit breaker 20, the positive input terminal A1 may be electrically connected to the positive output terminal B1, and the negative input terminal A2 may be electrically connected to the negative output terminal B2. In addition, still referring to FIG. 8, to enable the circuit breaker 20 to control an on/off status between the input terminal and the output terminal, an on/off control system 23 is usually disposed in the circuit breaker 20. A power supply on/off status of the electric equipment can be controlled by controlling either of a connection between the positive input terminal A1 and the positive output terminal B1 and a connection between the negative input terminal A2 and the negative output terminal B2. Based on this, a process of controlling the on/off status between the input terminal and the output terminal in this embodiment is described by using an example in which the on/off control system 23 is disposed between the positive input terminal A1 and the positive output terminal B1. To connect the negative input terminal A2 to the negative output terminal B2, a connection manner may be, but is not limited to, a direct electrical connection performed by using a conducting wire.

Still referring to FIG. 8, the circuit breaker 20 further includes a slide buckle 24 and a switch off structure 25. The switch off structure 25 is configured to: when being driven, control the circuit breaker 20 to be in the open state. The switch off structure 25 may include a connecting rod mechanism 251 and a rotating shaft 252. The positive input terminal A1 is connected to a first contact Q1 of the on/off control system 23, and the positive output terminal B1 is connected to a second contact Q2 of the on/off control system 23. When the switch on mechanism 22 is pushed in a direction close to the slide buckle 24, the switch on mechanism 22 pushes the connecting rod mechanism 251 to rotate around the rotating shaft 252, so that a first connecting rod 2511 of the connecting rod mechanism 251 pushes the first contact Q1 of the on/off control system 23 to rotate towards the second contact Q2, until the first contact Q1 is in contact with the second contact Q2. In this way, the positive input terminal A1 and the positive output terminal B1 are in a circuit-conducted state, so that the circuit breaker 20 is closed. When the switch on mechanism 22 is pulled out in a direction away from the slide buckle 24, the connecting rod mechanism 251 rotates around the rotating shaft 252 in a reverse direction, so that the first contact Q1 of the on/off control system 23 rotates in a direction away from the second contact Q2. In this way, the positive input terminal A1 and the positive output terminal B1 are in a circuit-broken state, so that the circuit breaker 20 is open.

In a use process of the circuit breaker 20, a short-circuit failure may occur in the power receiving line. If the power supply line still supplies electric energy to the power receiving line after the failure occurs, a severe accident may be caused. Therefore, there is a relatively severe safety risk. To improve safety between the power supply line and the power receiving line, during implementation, an electromagnetic tripper may be further disposed in the circuit breaker. A second electromagnetic tripper 26 in FIG. 8 is used as an example. When the short-circuit failure exists in the power receiving line, the second electromagnetic tripper 26 drives the switch off mechanism 25, so that the switch off structure 25 controls the circuit breaker 20 to be in the open state, thereby implementing short-circuit protection.

Figure 9:
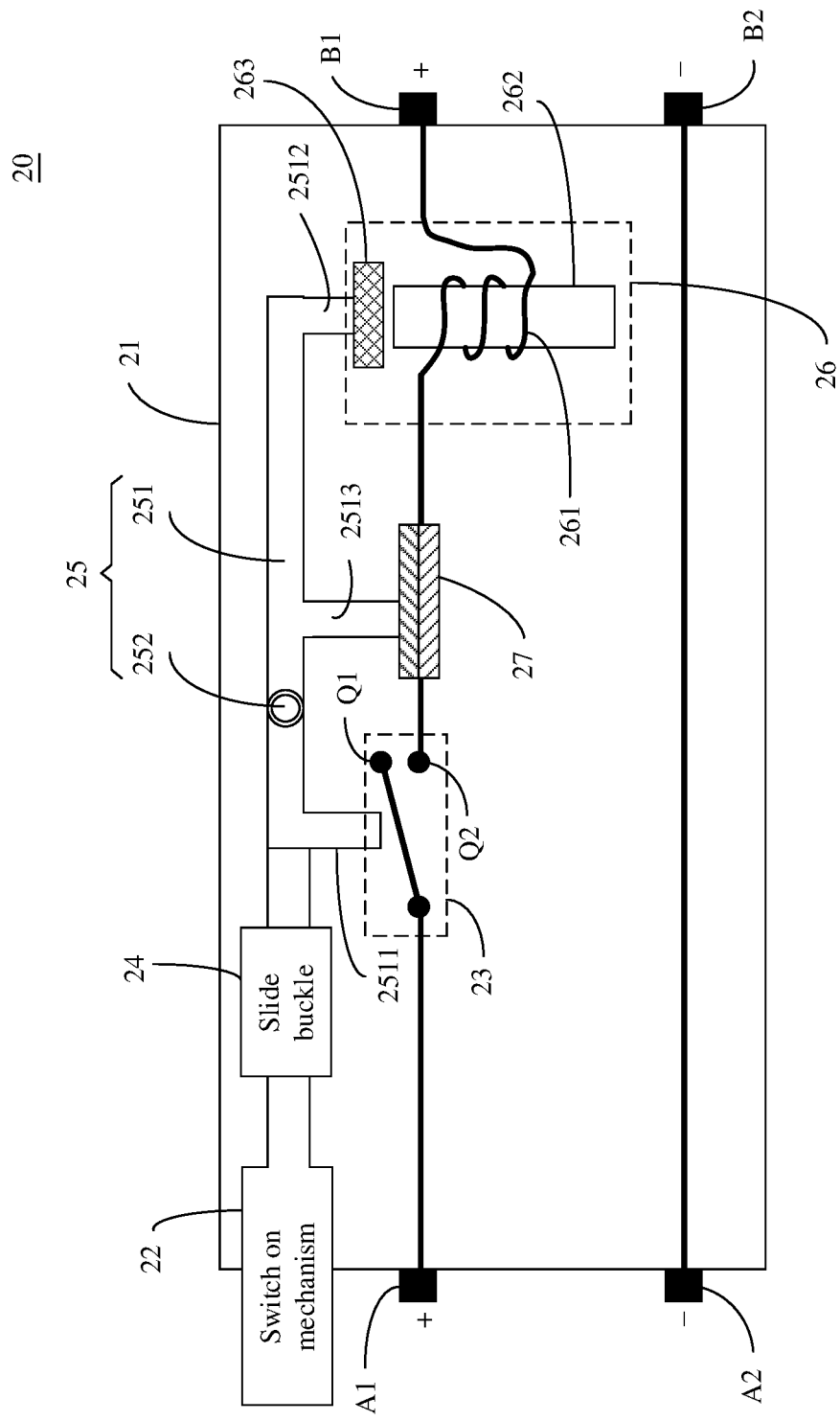
FIG. 9 is a schematic diagram of a structure of a circuit breaker according to another embodiment.

For example, referring to FIG. 9, the second electromagnetic tripper 26 includes an electromagnet. The second electromagnetic tripper 26 may include a second coil 261, a second iron core 262, and a second armature 263. The second coil 261 is sleeved onto the second iron core 262. One end of the second coil 261 may be electrically connected to the second contact Q2 by using a conductor (for example, a metal wire or a metal sheet), and the other end may be electrically connected to the positive output terminal B1. A current of the positive input terminal A1 flows to the positive output terminal B1 after passing through the conductor and the second coil 261. When the short-circuit failure exists in the power receiving line, a current flowing through the second coil 261 is excessively large. When the current exceeds a preset current threshold of the circuit breaker 20, the second coil 261 generates a relatively large magnetic field, so that the second iron core 262 generates an electromagnetic force for moving the second armature 263. When the second iron core 262 acts on the second armature 263, a second connecting rod 2512 of the connecting rod mechanism 251 is pushed. The second connecting rod 2512 causes the connecting rod mechanism 251 to rotate around the rotating shaft 252, so that the first contact Q1 moves in the direction away from the second contact Q2, until the first contact Q1 is separated from the second contact Q2. Therefore, a current path between the positive input terminal A1 and the positive output terminal B1 is cut off, thereby implementing short-circuit protection.

In addition to a short-circuit risk, an overload failure may alternatively occur in the power receiving line. If the power supply line still supplies electric energy to the power receiving line after the failure occurs, a severe accident may be caused. Therefore, there is a relatively severe safety risk. To further improve safety between the power supply line and the power receiving line, a thermal tripper may be further disposed in the circuit breaker. A second thermal tripper 27 in FIG. 8 is used as an example. When the overload failure exists in the power receiving line, the second thermal tripper 27 drives the switch off mechanism 25, so that the switch off structure 25 controls the circuit breaker 20 to be in the open state, thereby implementing overload protection.

For example, referring to FIG. 9, the second thermal tripper 27 may include a first thermal deformation metal. One end of the first thermal deformation metal may be electrically connected to the second contact Q2, and the other end may be electrically connected to the positive output terminal B1. When the overload failure exists in the power receiving line, a large amount of heat is generated in the power receiving line. When the amount of heat exceeds a preset heat threshold of the circuit breaker 20, the first thermal deformation metal is deformed, and a third connecting rod 2513 causes the connecting rod mechanism 251 to rotate around the rotating shaft 252, so that the first contact Q1 moves in the direction away from the second contact Q2, until the first contact Q1 is separated from the second contact Q2. Therefore, a current path between the positive input terminal A1 and the positive output terminal B1 is cut off, thereby implementing overload protection.

The following describes in detail a working principle of the reverse power connection preventing circuit with reference to some implementations of the actuation unit 33.

First case: The actuation unit 33 may be configured to lock the switch on mechanism 22 when the diode 31 conducts. That is, when the power supply 10 is reversely connected, the diode 31 in the reverse power connection preventing circuit 30 is conducted. However, because the actuation unit 33 can lock the switch on mechanism 22, the switch on mechanism 22 can be prevented from being manipulated, thereby preventing closing of the circuit breaker.

Figure 10A:
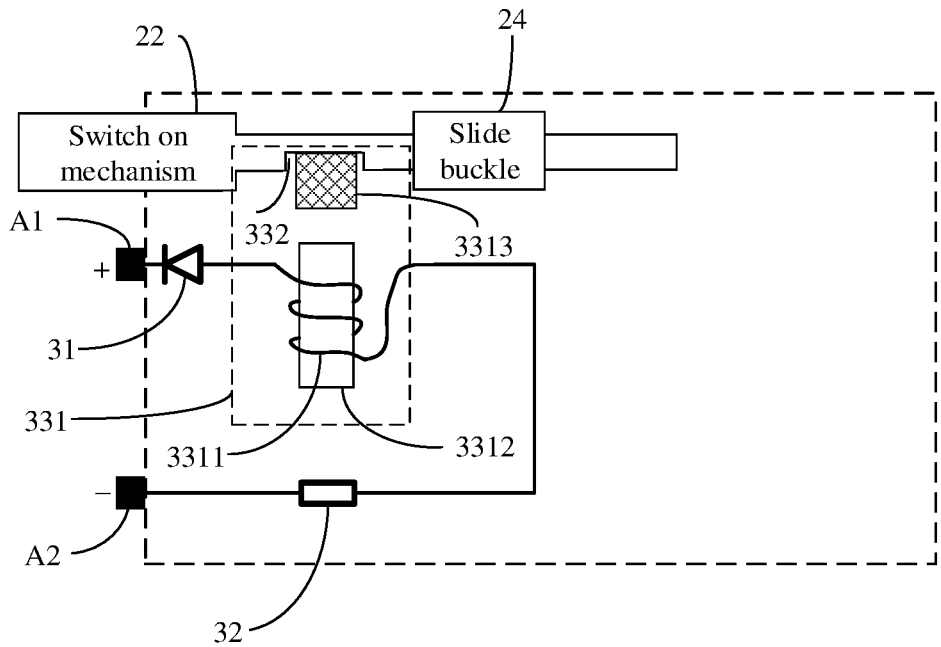
FIG. 10a is a schematic diagram of a structure corresponding to a reverse power connection preventing circuit during electric-conduction according to another embodiment.
Figure 10B:
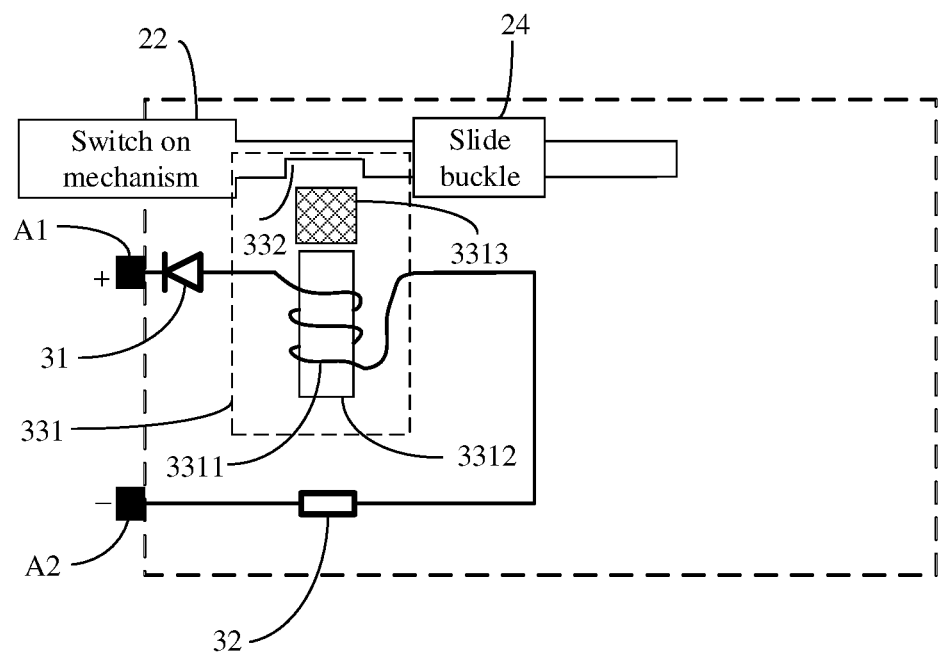
FIG. 10b is a schematic diagram of a structure corresponding to a reverse power connection preventing circuit during power-off according to another embodiment.

In a possible implementation, as shown in FIG. 10a and FIG. 10b, the actuation unit 33 may include a first electromagnet 331, and a clamping slot 332 is disposed on the switch on mechanism 22 of the circuit breaker 20. The first electromagnet 331 is connected in series to the diode 31 and the current limiting resistor 32. The first electromagnet 331 is configured to: when the diode 31 conducts, drive an armature of the first electromagnet 331 to be inserted into the clamping slot 332, to lock the switch on mechanism 22 of the circuit breaker 20, thereby preventing closing of the circuit breaker 20. For example, as shown in FIG. 10a and FIG. 10b, the first electromagnet 331 includes a first coil 3311, a first iron core 3312, and a first armature 3313. The first coil 3311 is connected in series to the diode 31 and the current limiting resistor 32. When the power supply 10 is reversely connected, referring to FIG. 10a, the diode 31 conducts, and the first coil 3311 is powered on and drives the first armature 3313 to be inserted into the clamping slot 332, to lock the switch on mechanism 22 of the circuit breaker 20, thereby preventing closing of the circuit breaker 20. When the power supply 10 is forward connected, referring to FIG. 10b, the diode 31 is cut off, the first armature 3313 is away from the clamping slot 332, and the reverse power connection preventing circuit 30 is in a power-off state and does not act on the circuit breaker 20.

During implementation, the clamping slot 332 may be disposed at any position that can lock the switch on mechanism 22. This is not limited herein.

In addition, when a fuse is disposed in the reverse power connection preventing circuit 30, the fuse may be reused as at least a part of the first coil 3311. This may be implemented by adjusting a structure and a material of a part of the first coil 3311. This is not limited herein.

Second case: The actuation unit 33 may be configured to drive the switch off mechanism 25 when the diode 31 conducts. That is, when the power supply 10 is reversely connected, the diode 31 in the reverse power connection preventing circuit 30 is conducts. However, because the actuation unit 33 can drive the switch off mechanism 25, the switch off mechanism 25 controls the circuit breaker 20 to be in the open state.

Figure 11:
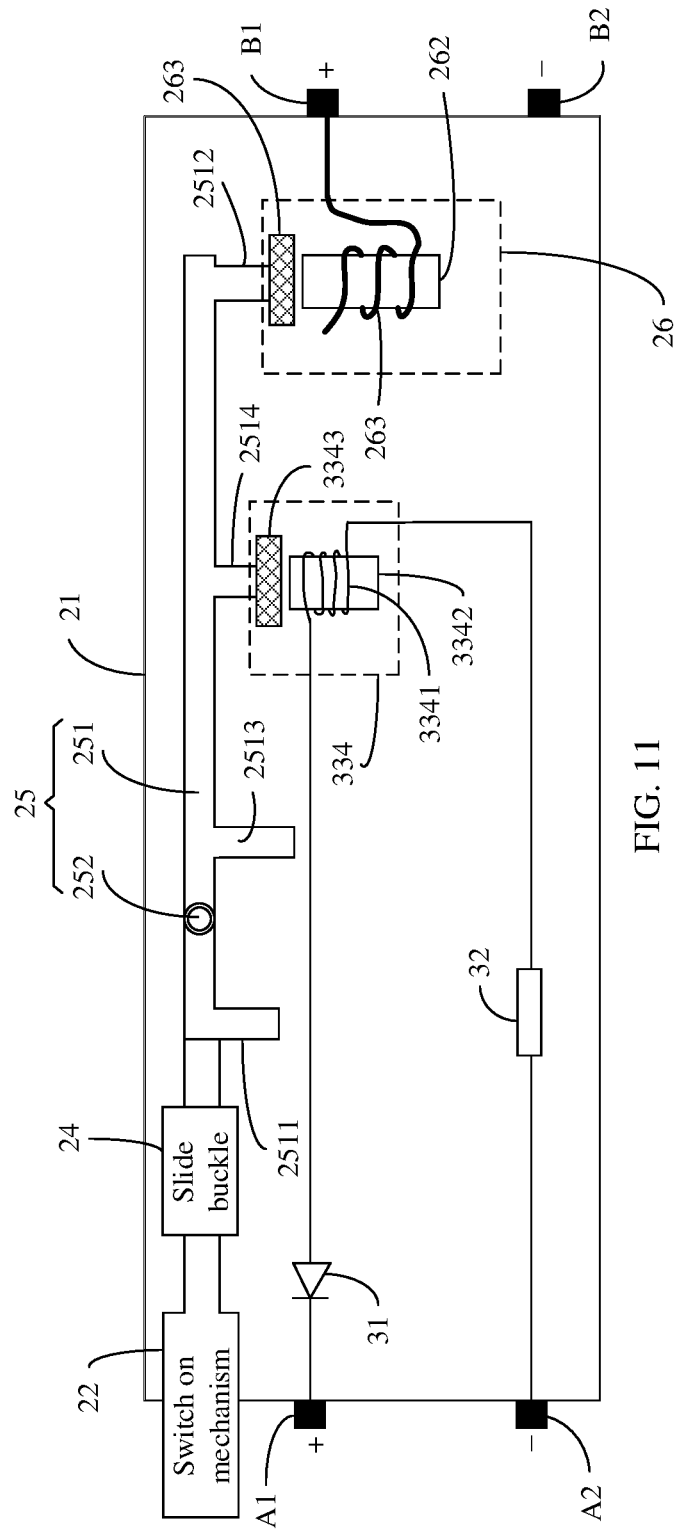
FIG. 11 is a schematic diagram of a structure of a reverse power connection preventing circuit according to another embodiment.

In a possible implementation, as shown in FIG. 11, in the reverse power connection preventing circuit, the actuation unit 33 may include a first electromagnetic tripper 334. The first electromagnetic tripper 334 is connected in series to the diode 31 and the current limiting resistor 32. The first electromagnetic tripper 334 is configured to drive the switch off mechanism 25 of the circuit breaker 20 when the diode 31 is conducted, to control the circuit breaker 20 to be in the open state. For example, as shown in FIG. 11, the first electromagnetic tripper 334 includes an electromagnet. The first electromagnetic tripper 334 may include a third coil 3341, a third iron core 3342, and a third armature 3343. The third coil 3341 is connected in series to the diode 31 and the current limiting resistor 32. When the power supply is reversely connected, the diode 31 conducts, and a current of the negative input terminal A2 flows to the positive input terminal A1 after passing through the third coil 3341. The current flowing through the third coil 3341 generates a relatively large magnetic field, so that the third iron core 3342 generates an electromagnetic force for moving the third armature 3343. After the third armature 3343 is moved by the third iron core 3342, the third armature 3343 pushes a fourth connecting rod 2514 of the connecting rod mechanism 251. The fourth connecting rod 2514 causes the connecting rod mechanism 251 to rotate around the rotating shaft 252, so that the first contact moves in the direction away from the second contact, until the first contact is separated from the second contact. Therefore, a current path between the positive input terminal A1 and the positive output terminal B1 is cut off, so that the circuit breaker 20 is in the open state.

Figure 12:
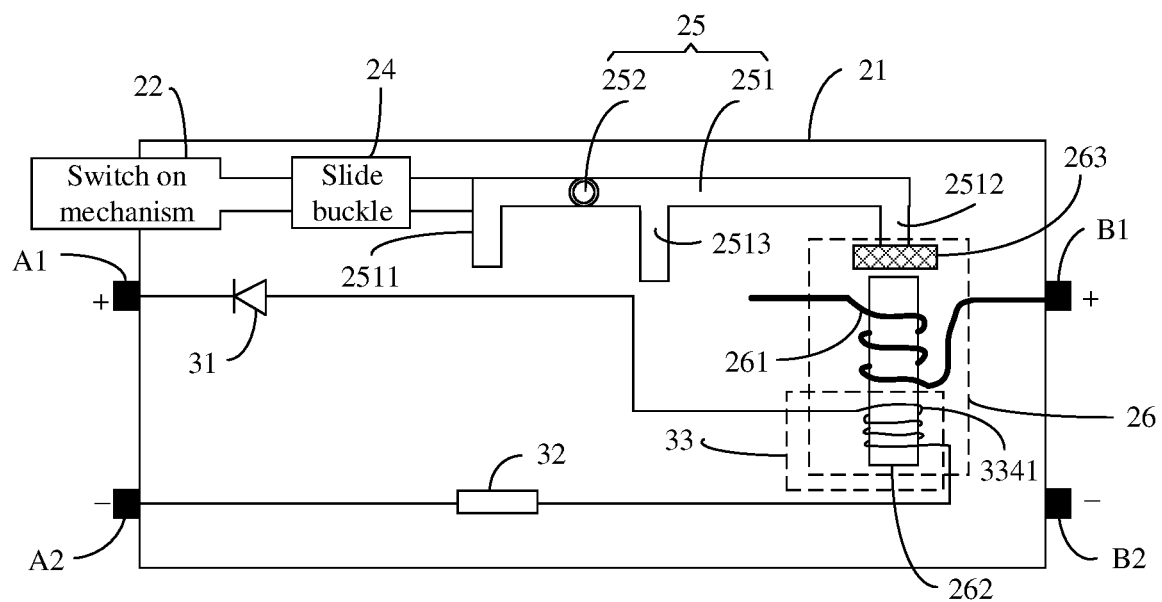
FIG. 12 is a schematic diagram of a structure of a reverse power connection preventing circuit according to another embodiment.

In another possible implementation, as shown in FIG. 12, in the reverse power connection preventing circuit, the second iron core 262 of the second electromagnetic tripper 26 is reused as a third iron core of the first electromagnetic tripper, and the second armature 263 of the second electromagnetic tripper 26 is reused as an armature of the first electromagnetic tripper. That is, the third coil 3341 is sleeved onto the second iron core 262 of the second electromagnetic tripper 26. When the power supply is reversely connected, the diode 31 conducts, and a current of the negative input terminal A2 flows to the positive input terminal A1 after passing through the third coil 3341. The current flowing through the third coil 3341 generates a relatively large magnetic field, so that the second iron core 262 generates an electromagnetic force for moving the second armature 263. When the second iron core 262 acts on the second armature 263, the second connecting rod 2512 of the connecting rod mechanism 251 is pushed. The second connecting rod 2512 causes the connecting rod mechanism 251 to rotate around the rotating shaft 252, so that the first contact moves in the direction away from the second contact, until the first contact is separated from the second contact. Therefore, a current path between the positive input terminal A1 and the positive output terminal B1 is cut off, so that the circuit breaker 20 is in the open state. Compared with the embodiment in FIG. 11, in this embodiment, the original components of the second electromagnetic tripper 26 are reused. It is equivalent that the actuation unit 33 includes only the third coil 3341 sleeved onto the second iron core 262 of the second electromagnetic tripper 26. Therefore, a structure of the reverse power connection preventing circuit is simplified, so that both a volume of the reverse power connection preventing circuit and costs can be reduced.

In addition, when a fuse is disposed in the reverse power connection preventing circuit 30, the fuse may be reused as at least a part of the third coil 3341. This may be implemented by adjusting a structure and a material of a part of the third coil 3341. This is not limited herein.

During implementation, the electromagnet has a plurality of structural forms. Based on a magnetic path system form, the plurality of structural forms may be classified into a snap-fit type, a disk type, an E-shaped type, a solenoid type, and the like. Based on an armature movement manner, the plurality of structural forms may be classified into a rotating type and a direct-acting type. This is not limited herein.

Figure 13:
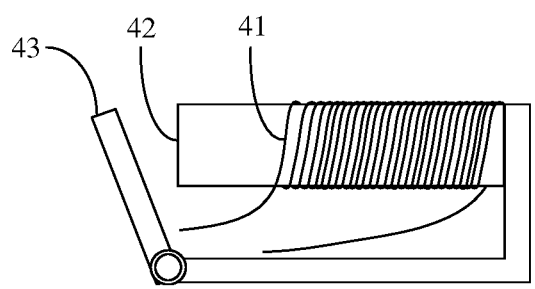
FIG. 13 is a schematic diagram of a structure of an electromagnet according to an embodiment.

For example, as shown in FIG. 13, an electromagnet 40 includes three parts: a coil 41, an iron core 42, and an armature 43. The iron core 42 and the armature 43 are usually made of a soft magnetic material, the iron core 42 is usually stationary, and the coil 41 is sleeved onto the iron core 42. The electromagnet 40 further includes a spring. When the coil 41 is powered on, the iron core 42 and the armature 43 are magnetized to become two magnets with opposite polarity or same polarity. An electromagnetic attraction force or repulsion force is generated between the two magnets. When the attraction force or repulsion force is greater than a reaction force of the spring, the armature 43 starts to move towards the iron core 42 or against the iron core 42. When a current in the coil 41 is less than a preset value, or power supply is interrupted, an electromagnetic force is less than a reaction force of the spring, and the armature 43 returns to an original release position under the action of the reaction force.

Figure 14:
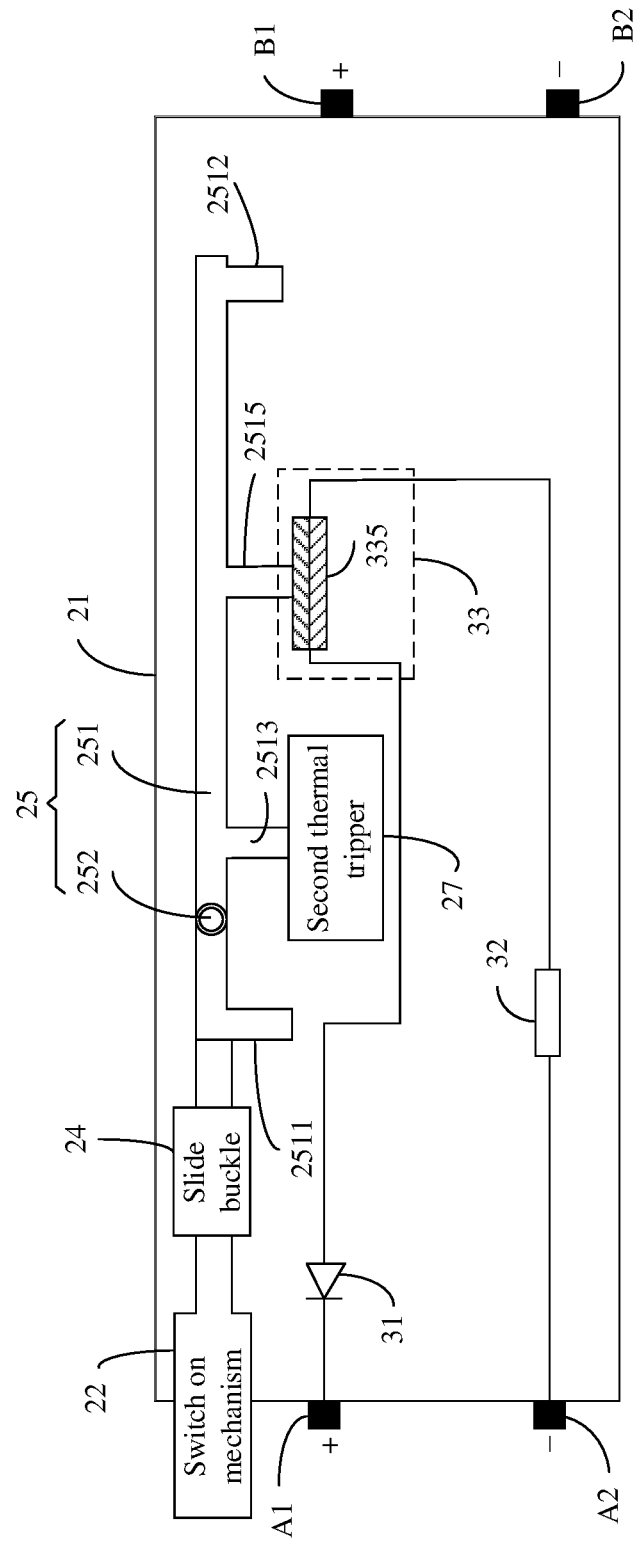
FIG. 14 is a schematic diagram of a structure of a reverse power connection preventing circuit according to another embodiment.

In another possible implementation, as shown in FIG. 14, the actuation unit 33 includes a first thermal tripper 335. The first thermal tripper 335 is connected in series to the diode 31 and the current limiting resistor 32. The first thermal tripper 335 is configured to drive the switch off mechanism 25 of the circuit breaker 20 when the diode 31 conducts, to control the circuit breaker 20 to be in the open state. For example, as shown in FIG. 14, the first thermal tripper 335 includes a second thermal deformation metal, and the second thermal deformation metal is connected in series to the diode 31 and the current limiting resistor 32. When the power supply 10 is reversely connected, the second thermal deformation metal is deformed, and a fifth connecting rod 2515 causes the connecting rod mechanism 251 to rotate around the rotating shaft 252, so that the first contact moves in the direction away from the second contact, until the first contact is separated from the second contact. Therefore, a current path between the positive input terminal A1 and the positive output terminal B1 is cut off, so that the circuit breaker 20 is in the open state.

Figure 15:
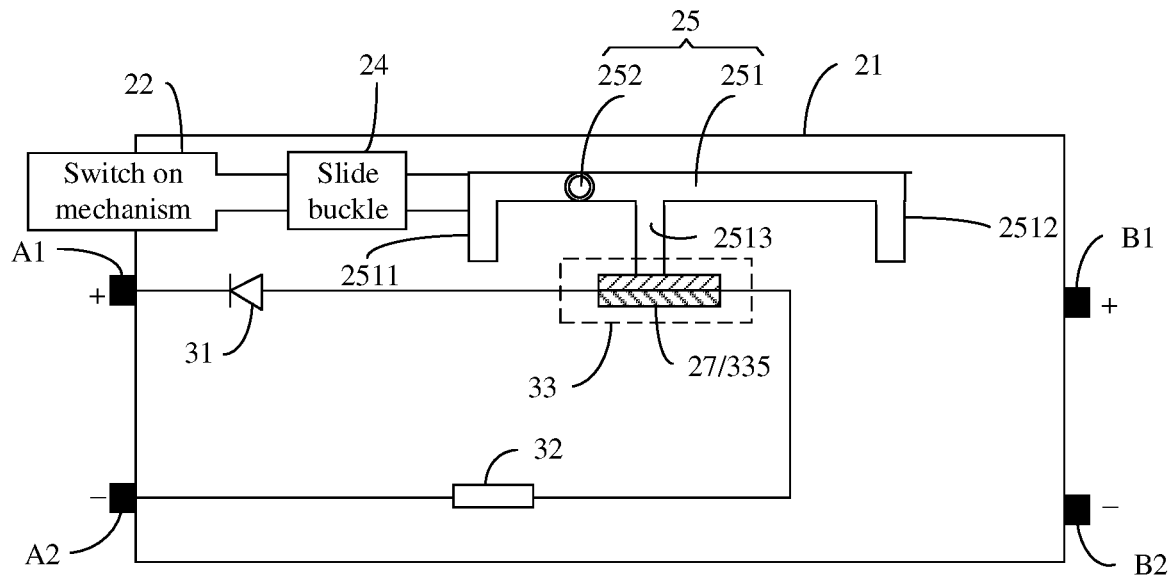
FIG. 15 is a schematic diagram of a structure of a reverse power connection preventing circuit according to another embodiment.

In another possible implementation, as shown in FIG. 15, the original second thermal tripper 27 in the circuit breaker 20 is reused as the first thermal tripper 335, and the second thermal tripper 27 needs to be connected in series to the diode 31 and the current limiting resistor 32. When the power supply is reversely connected, the diode 31 is conducts, the first thermal deformation metal in the second thermal tripper 27 is deformed, and the third connecting rod 2513 causes the connecting rod mechanism 251 to rotate around the rotating shaft 252, so that the first contact moves in the direction away from the second contact, until the first contact is separated from the second contact. Therefore, a current path between the positive input terminal A1 and the positive output terminal B1 is cut off, so that the circuit breaker 20 is in the open state. Compared with the embodiment in FIG. 14, in this embodiment, the second thermal tripper 27 is reused as the first thermal tripper 335, to avoid adding an additional thermal tripper. Therefore, a structure of the reverse power connection preventing circuit is simplified, so that both a volume of the reverse power connection preventing circuit and costs can be reduced.

Figure 16:
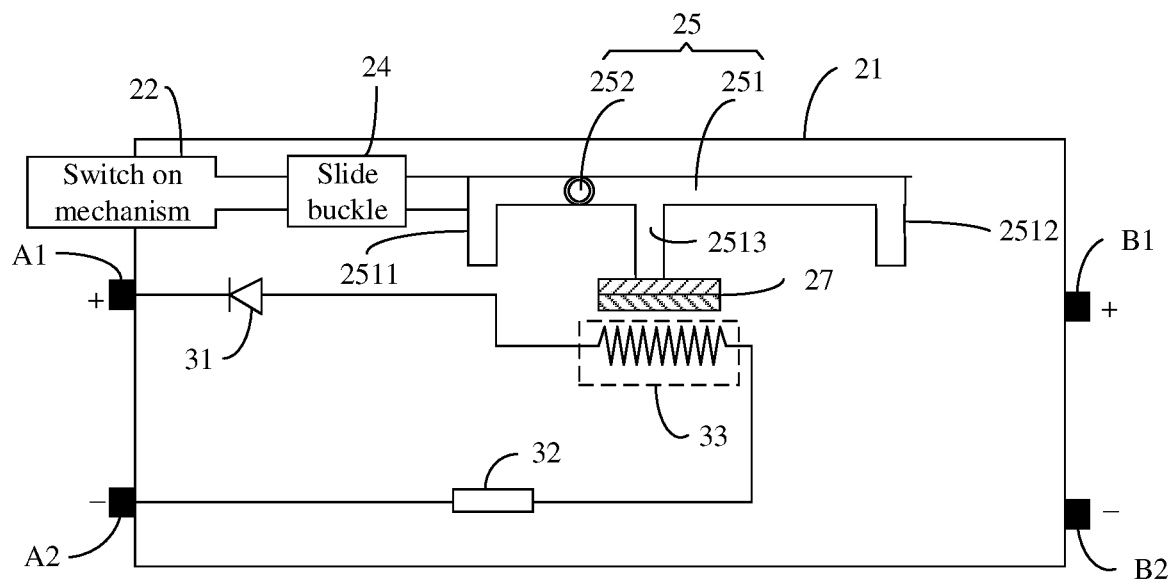
FIG. 16 is a schematic diagram of a structure of a reverse power connection preventing circuit according to another embodiment.

In another possible implementation, as shown in FIG. 16, the actuation unit 33 includes a heat emitting element. The heat emitting element is connected in series to the diode 31 and the current limiting resistor 32. The heat emitting element is configured to deform the first thermal deformation metal of the second thermal tripper 27 in the circuit breaker 20 when the diode 31 conducts, to drive the switch off mechanism 25 of the circuit breaker 20 to control the circuit breaker 20 to be in the open state. When the power supply is reversely connected, the diode 31 conducts, the heat emitting element deforms the first thermal deformation metal of the second thermal tripper 27 in the circuit breaker 20, and the third connecting rod 2513 causes the connecting rod mechanism 251 to rotate around the rotating shaft 252, so that the first contact moves in the direction away from the second contact, until the first contact is separated from the second contact. Therefore, a current path between the positive input terminal A1 and the positive output terminal B1 is cut off, so that the circuit breaker 20 is in the open state.

During implementation, the thermal deformation metal may be made of a shape memory alloy. The shape memory alloy is a material that has a shape memory effect through thermoelasticity, Martensite phase transformation, and inverse Martensite phase transformation and that is made of more than two metal elements. The thermal deformation metal made of the shape memory alloy may be embodied as follows: After being plastically deformed in a first temperature range, the thermal deformation metal can recover to an original shape in a second temperature range. For example, at a normal temperature or a relatively low temperature, the thermal deformation metal made of the shape memory alloy keeps or approximately keeps in a straight line shape after being straightened. After the thermal deformation metal is heated to a temperature, the thermal deformation metal may automatically recover to an original curve shape. In addition, the thermal deformation metal may be alternatively made of a bimetallic finger. The bimetallic finger is a composite material made of two or more metals or other materials with proper properties. The bimetallic finger is also referred to as a thermal bimetallic finger. Due to different coefficients of thermal expansion of component layers, when a temperature changes, deformation of an active layer is greater than deformation of a passive layer, so that the entire bimetallic finger bends toward a passive layer side.

Third case: The actuation unit 33 may include a buzzer and/or a prompt light. When the power supply 10 is reversely connected, the diode 31 conducts, and the buzzer sends a sound alarm, the prompt light sends a light alarm, or the buzzer sends a sound alarm and simultaneously the prompt light sends a light alarm, to perform an early warning to prompt an operator not to close the circuit breaker 20. When the power supply 10 is forward connected, the diode 31 is cut off, and the actuation unit 33 is not powered on.

Fourth case: The third case is combined with the first case or the second case. That is, when an implementation of the actuation unit is the first case or the second case, the actuation unit may further include a buzzer and/or a prompt light. In this way, when the power supply is reversely connected, the reverse power connection preventing circuit can prevent closing of the circuit breaker, and also perform an alarm prompt.

Figure 17:
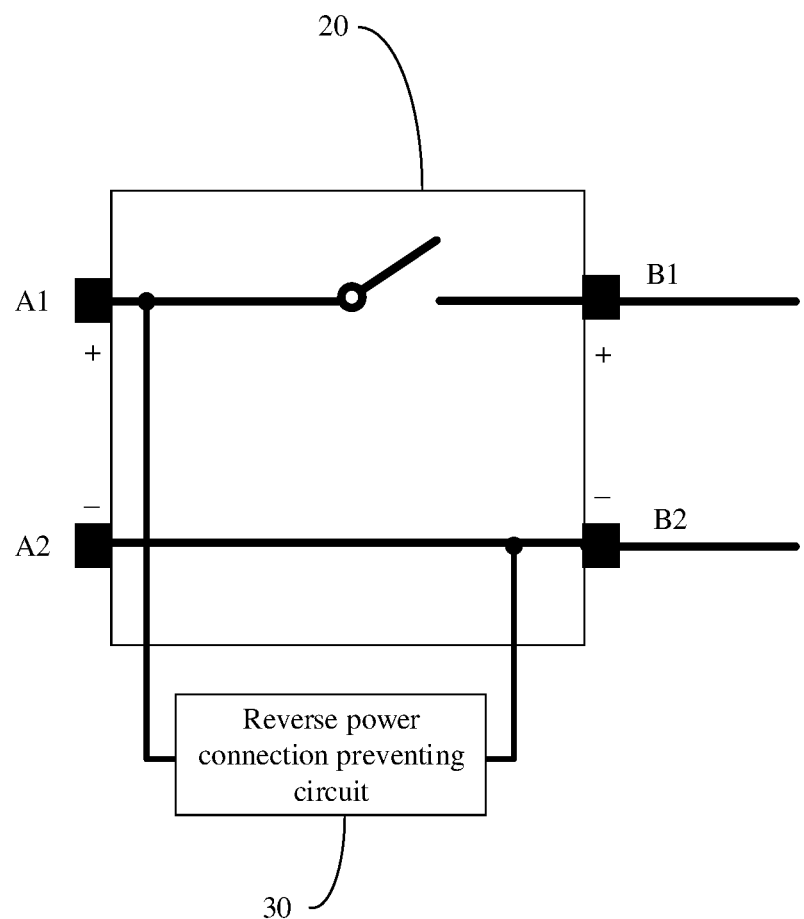
FIG. 17 is a schematic diagram of a structure of a power distribution apparatus according to an embodiment.

Referring to FIG. 17, the embodiments may further provide a power distribution apparatus 100, including a circuit breaker 20 and a reverse power connection preventing circuit 30. The reverse power connection preventing circuit 30 is connected to a positive input terminal A1 and a negative input terminal A2 of the circuit breaker 20. A problem resolving principle of the power distribution apparatus 100 is similar to that of the foregoing reverse power connection preventing circuit 30. Therefore, for an implementation of the power distribution apparatus 100, refer to the foregoing implementation of the reverse power connection preventing circuit 30. Repeated parts are not described again.

Figure 18:
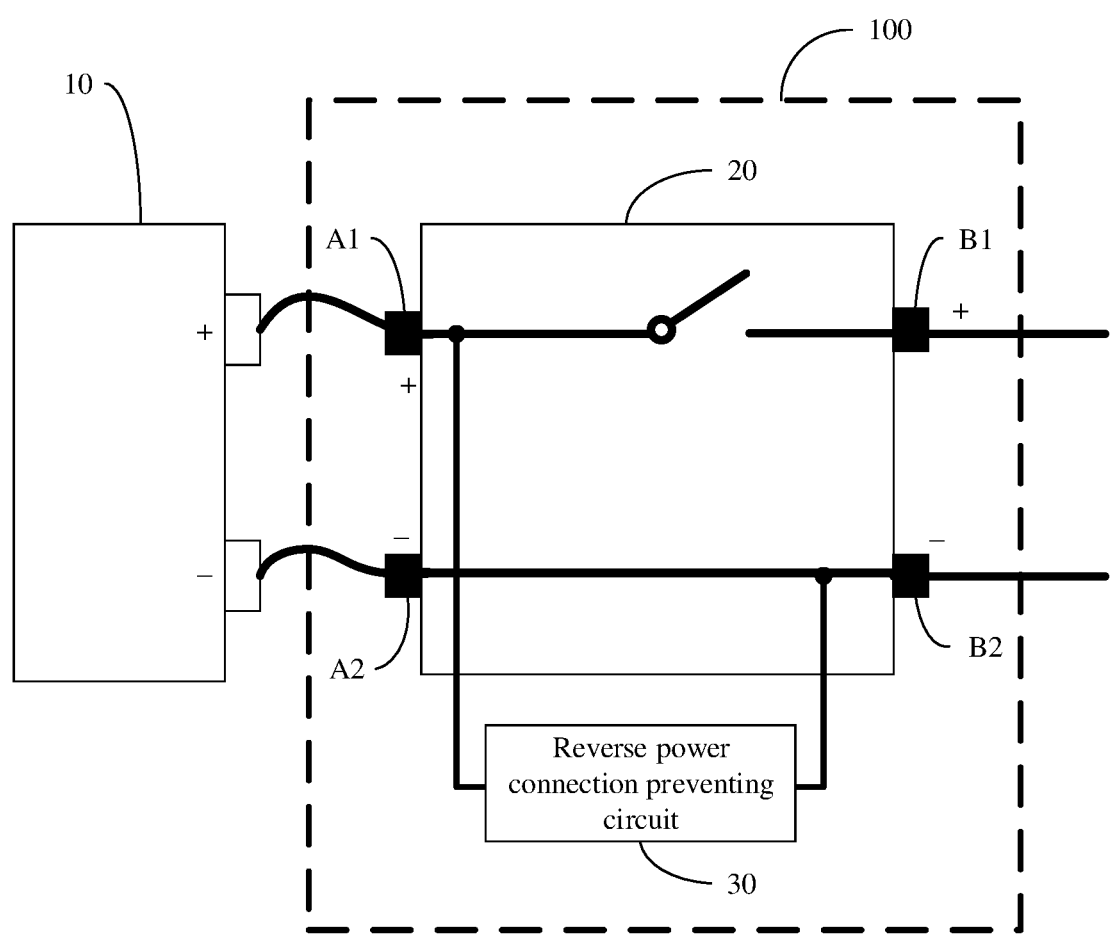
FIG. 18 is a schematic diagram of a structure of a power supply and distribution system according to an embodiment.

Referring to FIG. 18, the embodiments may further provide a power supply and distribution system 1000, including a power supply 10 and a power distribution apparatus 100. A positive electrode of the power supply 10 is connected to a positive input terminal A1 of a circuit breaker 20 in the power distribution apparatus 100, and a negative electrode of the power supply 10 is connected to a negative input terminal A2 of the circuit breaker 20 in the power distribution apparatus 100. The power supply and distribution system 1000 may be a power supply and distribution system of a 5G (5th generation, 5G for short) high-power radio base station, or may be a power supply and distribution system of a home circuit. An application field of the power supply and distribution system 1000 is not limited in this embodiment, and the power supply and distribution system 1000 may be applied to a line connection in any field.

Further, a person skilled in the art can make various modifications and variations to the embodiments without departing from the scope of the embodiments. The embodiments are intended to cover modifications and variations.

What is claimed is:

1. A reverse power connection preventing circuit, comprising:
   a diode and an actuation unit that are connected in series and provided within a circuit breaker, wherein the diode and the actuation unit are configured to connect a positive input terminal and a negative input terminal of the circuit breaker, wherein the diode is a two-terminal component having a first diode terminal and a second diode terminal, wherein the actuation unit has a first actuation unit terminal and a second actuation unit terminal, wherein the second diode terminal and first actuation unit terminal are connected, and wherein an undivided current path is provided between the first diode terminal and second actuation unit terminal;
   wherein, inside the circuit breaker, a positive electrode of the diode is connected to the negative input terminal of the circuit breaker, a negative electrode of the diode is connected to the positive input terminal of the circuit breaker, with the undivided current path being provided between the positive input terminal of the circuit breaker and the negative input terminal of the circuit breaker and through the diode and actuation unit such that the diode is configured to conduct in a case where current flows from the negative terminal of the circuit breaker, through the diode from the positive electrode to the negative electrode, and to the positive terminal of the circuit breaker, and the actuation unit is configured to either prevent closing of the circuit breaker when the diode conducts or perform an alarm prompt when the diode conducts.

2. The reverse power connection preventing circuit according to claim 1, further comprising:
   a current limiting resistor connected in series to the diode and the actuation unit.

3. The reverse power connection preventing circuit according to claim 2, wherein the circuit breaker further comprises:
   a switch on mechanism configured to, when being manipulated, control the circuit breaker to be closed or open, wherein the actuation unit is further configured to lock the switch on mechanism when the diode conducts.

4. The reverse power connection preventing circuit according to claim 3, wherein the actuation unit further comprises:
   an electromagnet, a clamping slot is disposed on the switch on mechanism of the circuit breaker, the electromagnet is connected in series to the diode and the current limiting resistor, is configured to, when the diode conducts, drive an armature of the electromagnet to be inserted into the clamping slot to lock the switch on mechanism of the circuit breaker to prevent closing of the circuit breaker.

5. The reverse power connection preventing circuit according to claim 2, wherein the circuit breaker further comprises:
   a switch off mechanism configured to, when being driven, control the circuit breaker to be in an open state, wherein the actuation unit is further configured to drive the switch off mechanism when the diode conducts.

6. The reverse power connection preventing circuit according to claim 5, wherein the actuation unit further comprises:
   a first electromagnetic tripper connected in series to the diode and the current limiting resistor, wherein the first electromagnetic tripper is configured to drive the switch off mechanism of the circuit breaker when the diode conducts to control the circuit breaker to be in the open state.

7. The reverse power connection preventing circuit according to claim 6, wherein the circuit breaker further comprises:
   a second electromagnetic tripper, wherein an iron core of the second electromagnetic tripper is reused as an iron core of the first electromagnetic tripper and an armature of the second electromagnetic tripper is reused as an armature of the first electromagnetic tripper.

8. The reverse power connection preventing circuit according to claim 5, wherein the actuation unit further comprises:
   a first thermal tripper connected in series to the diode and the current limiting resistor and configured to drive the switch off mechanism of the circuit breaker when the diode conducts to control the circuit breaker to be in the open state.

9. The reverse power connection preventing circuit according to claim 5, wherein the circuit breaker further comprises:
   a second thermal tripper comprising a thermal deformation metal, wherein the actuation unit further comprises a heat emitting element connected in series to the diode and the current limiting resistor, and the heat emitting element is configured to, when the diode conducts, deform the thermal deformation metal to drive the switch off mechanism of the circuit breaker to control the circuit breaker to be in the open state.

10. The reverse power connection preventing circuit according to claim 2, wherein the actuation unit further comprises either a buzzer or a prompt light.

11. The reverse power connection preventing circuit according to claim 2, further comprising a fuse, wherein the fuse is connected in series to the diode, the current limiting resistor, and the actuation unit.

12. The reverse power connection preventing circuit according to claim 11, wherein when the actuation unit comprises an electromagnet and the fuse is reused as at least a part of a coil of the electromagnet.

13. The reverse power connection preventing circuit according to claim 11, wherein, when the actuation unit comprises a first electromagnetic tripper, the fuse is reused as at least a part of a coil of the first electromagnetic tripper.

14. A power distribution apparatus, comprising
a circuit breaker, and
a reverse power connection preventing circuit comprising a diode and an actuation unit that are connected in series, provided within the circuit breaker,
wherein the diode is a two-terminal component having a first diode terminal and a second diode terminal, wherein the actuation unit has a first actuation unit terminal and a second actuation unit terminal, wherein the second diode terminal and first actuation unit terminal are connected, and wherein an undivided current path is provided between the first diode terminal and second actuation unit terminal, and
wherein, inside the circuit breaker, the diode and the actuation unit are configured to connect a positive input terminal and a negative input terminal of a circuit breaker, a positive electrode of the diode is connected to the negative input terminal of the circuit breaker, and a negative electrode of the diode is connected to the positive input terminal of the circuit breaker, with the undivided current path being provided between the positive input terminal of the circuit breaker and the negative input terminal of the circuit breaker and through the diode and actuation unit such that the diode is configured to conduct in a case where current flows from the negative terminal of the circuit breaker, through the diode from the positive electrode to the negative electrode, and to the positive terminal of the circuit breaker, the actuation unit is configured to either prevent closing of the circuit breaker when the diode conducts, or is configured to perform an alarm prompt when the diode is conducts, and the reverse power connection preventing circuit is connected between the positive input terminal and the negative input terminal of the circuit breaker.

15. A power supply and distribution system, comprising a power supply and the power distribution apparatus according to claim 14, wherein a positive electrode of the power supply is connected to the positive input terminal of a circuit breaker in the power distribution apparatus, and a negative electrode of the power supply is connected to the negative input terminal of the circuit breaker in the power distribution apparatus.

* * * * *